(12) United States Patent
Hongu et al.

(10) Patent No.: US 6,384,375 B1
(45) Date of Patent: May 7, 2002

(54) ARC WELDING POWER SUPPLY, PERIPHERAL DEVICE FOR ARC WELDING, AND ARC WELDING APPARATUS

(75) Inventors: Toshinori Hongu, Hyogo; Yasuzo Tsuchiya, Osaka, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/578,933

(22) Filed: May 25, 2000

(30) Foreign Application Priority Data

May 25, 1999 (JP) ............................................. 11-144466

(51) Int. Cl.$^7$ .............................................. B23K 9/095
(52) U.S. Cl. ................................................. 219/130.5
(58) Field of Search ...................... 219/130.33, 130.21, 219/130.31, 130.32, 130.5; 901/42

(56) References Cited

U.S. PATENT DOCUMENTS 4,445,022 A * 4/1984 Mori ....................... 219/130.5
4,578,562 A * 3/1986 Lindstrom et al. ........ 219/130.5
5,245,546 A * 9/1993 Iceland .................. 219/130.33

* cited by examiner

Primary Examiner—Clifford C. Shaw
(74) Attorney, Agent, or Firm—Ratner & Prestia

(57) ABSTRACT

In the arc welding power supply and peripheral device for arc welding such as arc welding robot controller, a stored data output unit (19) of an arc welding power supply (10) issues stored data of a welding voltage selector (13) of the arc welding power supply (10) to a stored data input unit (17) of an arc welding robot controller (1), and the stored data input unit (17) of the arc welding robot controller (1) stores the entered stored data in a welding voltage selector (5), so that the memory capacity for stored data of the peripheral device such as arc welding robot controller may be kept to a minimum required limit. Further, for use in various arc welding power supplies, the voltage command type can be easily changed over between the welding voltage command type and adjusting voltage command type.

11 Claims, 5 Drawing Sheets

Fig.5

| Welding method | Electrode diameter | Welding material |
|---|---|---|
| CO2 | 1.0mm φ | Mild Steel |
| Welding current | Selected voltage data of welding current | |
| 3 0 A | Selected voltage data of 30 A | |
| 3 1 A | Selected voltage data of 31 A | |
| 3 2 A | Selected voltage data of 32 A | |
| 3 3 A | Selected voltage data of 33 A | |
| · | · | |
| · | · | |
| · | · | |
| · | · | |
| 5 0 0 A | Selected voltage data of 500 A | |

ARC WELDING POWER SUPPLY, PERIPHERAL DEVICE FOR ARC WELDING, AND ARC WELDING APPARATUS

FIELD OF THE INVENTION

The present invention relates to an arc welding power supply for performing arc welding, a peripheral device for arc welding, and an arc welding apparatus.

BACKGROUND OF THE INVENTION

The arc welding apparatus is recently designed to perform welding by means of a robot controller for arc welding and an arc welding power supply.

A welding current command value and a welding voltage command value, or a welding current command value and an adjusting voltage command value are set in this robot controller for arc welding. These set command values are given to the arc welding power supply. The arc welding power supply determines the welding output according to the entered command values. The welding apparatus welds according to the determined welding output.

There are two types of command type of welding voltage to the arc welding power supply:

Independent commanding of the welding current and welding voltage (hereinafter called welding voltage command type); and Commanding by correcting the welding current and the voltage interlocked with the current (hereinafter called adjusting voltage command type).

For example, when welding at welding current of 120 A and welding voltage of 19.0 V (appropriate voltage also being 19.0 V), the welding operator sets the following data in the robot controller for arc welding:

In the case of welding voltage command type, current command value=120, voltage command value 19.0; and In the case of adjusting voltage command type, current command value=120 A, adjusting voltage command value=0.0.

Herein, the adjusting voltage command value (0.0 in this case) in the adjusting voltage command type is the difference between the welding voltage (19.0 V in this case) and the appropriate voltage (19.0 V in this case).

In the recent arc welding apparatus, such voltage command types can be changed over and used. In this case, the voltage command value is, when the voltage command type is changed over, automatically converted to the voltage command value of the selected voltage command type (welding voltage command type or adjusting voltage command type).

A conventional arc welding power supply is explained below by referring to the drawing.

FIG. 4 is a block diagram showing a constitution of welding system by an arc welding power supply and arc welding robot in a prior art. As shown in the block diagram in FIG. 4, the conventional welding system is composed of a robot controller for arc welding 101A and an arc welding power supply 110.

The robot controller for arc welding 101A comprises:

a) a welding current setting unit (hereinafter referred to simply as "WC setting unit") 2, b) a welding voltage setting unit (hereinafter referred to simply as "WV setting unit") 3, c) an adjusting voltage setting unit (hereinafter referred to simply as "AV setting unit") 4, d) a welding voltage selector (hereinafter referred to simply as "WV selector") 5, e) a voltage command value calculator (hereinafter referred to simply as "VCV calculator") 6, f) a current command value output unit (hereinafter referred to simply as "CCV output unit") 7, g) a voltage command value output unit (hereinafter referred to simply as "VCV output unit") 8, and h) a voltage command type setting unit (hereinafter referred to simply as "VCT setting unit") 9.

The arc welding power supply 110 comprises:

a) a current command value input unit (hereinafter referred to simply as "CCV input unit") 11, b) a voltage command value input unit (hereinafter referred to simply as "VCV input unit") 12, c) a welding voltage selector (hereinafter referred to simply as "WV selector") 13, d) a voltage command value calculator (hereinafter referred to simply as "VCV calculator") 14, e) a welding output controller (hereinafter referred to simply as "WO controller") 22, f) an inverter 23, and g) output terminals 25, 26.

The inverter 23 is connected to a three-phase alternating-current power source 24.

The welding voltage selectors 5 and 13 are individually composed of a memory (not shown) and a selection output unit (not shown).

The memory stores a data table of each current determined individually for the welding method, electrode diameter, and welding material (hereinafter the data table stored in the memory is called the stored data).

The selection output unit selects and outputs an appropriate welding voltage from the stored data table depending on the set value of current.

The operation of this constitution is explained below.

First, in the robot controller for arc welding 101A, suppose the VCT setting unit 9 is set in the welding voltage command type. In this case, the welding operator:

Sets the VCT setting unit 9 in the welding voltage command type,

Sets the welding current in the current setting unit 2, and

Sets the welding voltage in the WV setting unit 3.

The current setting unit 2 outputs the set specified welding current, and the WV setting unit 3 outputs the set specified welding voltage.

At this time, the WV selector 5 selects and outputs an appropriate welding voltage (hereinafter called selected voltage) depending on the welding current set in the current setting unit 2. The VCV calculator 6 calculates the adjusting voltage by subtraction of the selected voltage outputted from the WV selector 5 and the welding voltage set in the WV setting unit 3. The VCV calculator 6 sends this adjusting voltage to the AV setting unit 4. The AV setting unit 4 stores this adjusting voltage in the memory (not shown).

When the VCT setting unit 9 is changed to the adjusting voltage command type, the AV setting unit 4 outputs the adjusting voltage stored in the memory unit.

Next, in the robot controller for arc welding 101A, suppose the VCT setting unit 9 is set in the adjusting voltage command type. In this case, the welding operator:

Sets the VCT setting unit 9 in the adjusting voltage command type,

Sets the welding current in the current setting unit 2, and

Sets the adjusting voltage in the AV setting unit 4.

The current setting unit 2 outputs the set specified welding current, and the AV setting unit 4 outputs the set specified adjusting voltage.

At this time, the WV selector 5 selects and outputs a selected voltage depending on the welding current set in the current setting unit 2. The VCV calculator 6 calculates the welding voltage by addition of the selected voltage outputted from the WV selector 5 and the adjusting voltage set in the AV setting unit 4. The VCV calculator 6 sends this welding voltage to the WV setting unit 3. The WV setting unit 3 stores this welding voltage in the memory (not shown).

When the VCT setting unit 9 is changed to the welding voltage command type, the WV setting unit 3 outputs the welding voltage stored in the memory unit.

Thus, the welding current, and the welding voltage or adjusting voltage are set. Consequently, the CCV output unit 7 receives the output signal from the current setting unit 2, and outputs a signal depending on the set current command value. Further, the VCV output unit 8, when the VCT setting unit 9 is set in the welding voltage command type, outputs a signal depending on the voltage command value set in the WV setting unit 3. When set in the adjusting voltage command type, the VCV output unit 8 outputs a signal depending on the adjusting voltage set in the AV setting unit 4.

On the other hand, in the arc welding power supply 110, when the VCT setting unit 9 is set in the welding voltage command type, the CCV input unit 11 receives the output signal from the CCV output unit 7, and outputs a current set value. The VCV input unit 12 receives the output signal from the VCV output unit 8, and outputs a voltage set value.

Or, in the arc welding power supply 110, when the VCT setting unit 9 is set in the adjusting voltage command type, the CCV input unit 11 receives the output signal from the CCV output unit 7, and outputs a current set value. The VCV input unit 12 receives the output signal from the VCV output unit 8, and outputs an adjusting voltage.

Whether the VCT setting unit 9 is set in the welding voltage command type or adjusting voltage command type, the WV selector 13 selects and outputs a selected voltage depending on the current command value entered from the CCV input unit 11. Further, the VCV calculator 14 adds the selected voltage entered from the welding voltage selector 13 and the voltage entered from the VCV input unit 12, and calculates the voltage set value. The VCV calculator 14 outputs this voltage set value.

The WO controller 22 receives:

a current set value outputted from the CCV input unit 11, and a voltage set value outputted by the VCV input unit 12 or a voltage set value outputted by the VCV calculator 14.

The WO controller 22 controls the inverter so that the entered current set value and output current, and the entered voltage set value and output voltage may coincide with each other, and applies a welding output to output terminals (25, 26).

In such conventional arc welding apparatus, in order to change over the voltage command type, the robot controller for arc welding requires the stored data stored in the memory of the welding voltage selector in the same content as in the arc welding power supply. In arc welding, however, the stored data varies in each welding method, electrode diameter, and welding material. In order to be applicable to various arc welding power supplies, it was a problem that the arc welding robot controller must have a tremendous amount of data stored in each arc welding power supply.

For example, in one general kind of arc welding power supply,

Welding method: 2 kinds (CO2, MAG)

Electrode diameter: 3 kinds (0.9, 1.0, 1.2 mm)

Welding material: 2 kinds (mild steel, mild steel FCW)

Current capacity: 500 A the quantity of information is $$2\times3\times2\times500=6{,}000$$

assuming to have one selected voltage in every 1 A of welding current. It requires the memory capacity for storing the data tables of appropriate voltage corresponding to this quantity of information. Actually, however, there is a minimum limit welding current, the memory capacity is smaller by the corresponding portion.

FIG. 5 shows a data table in the case of, for example:

Welding method: CO2

Electrode diameter: 1.0 mm

Welding material: Mild steel

Current capacity: 30 A to 500 A

In the case of the general arc welding power supply mentioned above, 12 tables as shown in FIG. 5 are required.

Further, to be applicable to various arc welding power supplies, for example, in the case of:

Welding method: 3 kinds (CO2, MAG (MIG), pulse MAG (MIG))

Electrode diameter: 6 kinds (0.8, 0.9, 1.0, 1.2, 1.4, 1.6 mm)

Welding material: 6 kinds (mild steel, mild steel FCW, stainless steel, stainless steel FCW, hard aluminum, soft aluminum)

Current capacity: 500 A

No. of models: 3 kinds (200 A, 350 A, 500 A)

by simple calculation, the quantity of information is $$3\times6\times6\times500\times3=162{,}000.$$

It requires the memory capacity for storing the data tables of appropriate voltage corresponding to this quantity of information. To be applicable to various arc welding power supplies, 324 data tables as shown in FIG. 5 are needed. The memory capacity is tremendous.

SUMMARY OF THE INVENTION

The invention is devised to solve the above problems, and is hence applicable to various arc welding power supplies. It is also an object of the invention to present an arc welding apparatus capable of minimizing the quantity of information of data table of appropriate voltage in a peripheral device for arc welding, such as arc welding robot.

The welding apparatus of the invention comprises a peripheral device for arc welding such as arc welding robot, and an arc welding power supply (hereinafter referred to simply as "AWPS"). The arc welding robot is presented as an example below. This arc welding robot is composed of an arc welding robot controller (hereinafter referred to simply as "AWRC") and a manipulator of which operation is controlled by the AWRC.

The AWRC comprises:

a) a welding current setting unit for welding, b) a welding voltage setting unit for welding, c) an adjusting voltage setting unit for welding,
d) a voltage command type setting unit for changing over and setting the welding voltage command type or adjusting voltage command type,
e) a welding voltage selector for selecting and issuing an appropriate welding voltage depending on the current set in the welding current setting unit,
f) a voltage command value calculator for
  1. calculating the adjusting voltage from the selected voltage issued from the welding voltage selector and the welding voltage set in the welding voltage setting unit, or
  2. calculating the welding voltage from the selected voltage issued from the welding voltage selector and the adjusting voltage set in the adjusting voltage setting unit,
g) a current command value output unit for receiving an output signal from the welding current setting unit, and issuing a signal depending on the set current command value,
h) a voltage command value output unit for issuing a signal depending on the voltage command value set in the welding voltage setting unit, or the adjusting voltage set in the adjusting voltage setting unit,
i) a stored data request output unit for requesting stored data stored in the welding power supply, and
j) a stored data input unit for accepting the stored data issued from the welding power supply.

The AWPS comprises:
a) a current command value input unit for accepting the signal issued from the current command value output unit of the AWRC,
b) a voltage command value input unit for accepting the signal issued from the voltage command value output unit of the AWRC,
c) a welding voltage selector for storing the data about welding of the welding power supply, and selecting and issuing an appropriate welding voltage from the stored data depending on the current set in the current command value input unit,
d) a voltage command value calculator for calculating the voltage set value by adding the selected voltage entered from the welding voltage selector and the voltage entered from the voltage command value input unit,
e) a stored data request input unit for accepting the request from the stored data request output unit of the peripheral device for arc welding, and
f) a stored data output unit for acquiring and issuing the stored data from the welding voltage selector.

The welding power supply further includes:
g) a welding output controller,
h) an inverter, and
i) output terminals.

Thus, the AWRC of the arc welding apparatus of the invention comprises the stored data request output unit and stored data input unit, in addition to the conventional AWRC. The stored data input unit sends the stored data to the welding voltage selector.

The AWPS of the arc welding apparatus of the invention comprises the stored data request input unit and stored data output unit, in addition to the conventional AWPS. The stored data output unit acquires and issues the stored data from the welding voltage selector.

When the stored data request signal is issued from the stored data request unit of the AWRC to the AWPS, the AWPS sends the stored data to the AWRC. When the stored data is entered, the AWRC updates the already stored data to the newly entered stored data.

The invention can output the stored data of the welding power supply, and can minimize the memory capacity relating to the stored data of the AWRC.

BRIEF DESCRIPTION OF THE DRAWINGS

FIG. 5 is an example showing a data table of selected voltage corresponding to welding current.

DETAILED DESCRIPTION OF THE PREFERRED EMBODIMENTS (Embodiment 1)

Embodiment 1 of arc welding apparatus of the invention is described below while referring to the accompanying drawings.

Figure 1:
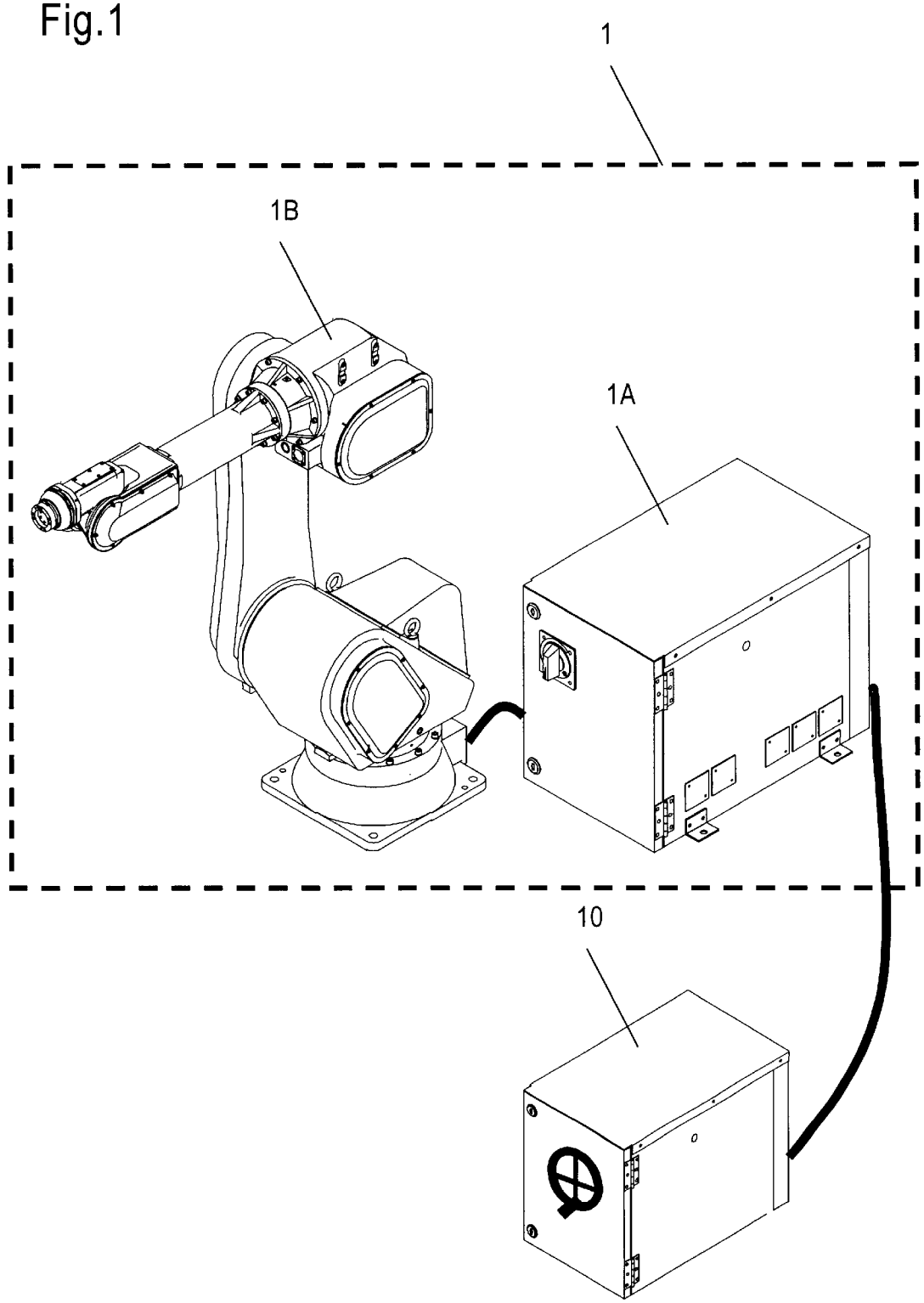
FIG. 1 is a schematic outline drawing showing a constitution of embodiment 1 of arc welding apparatus of the invention.
Figure 2:
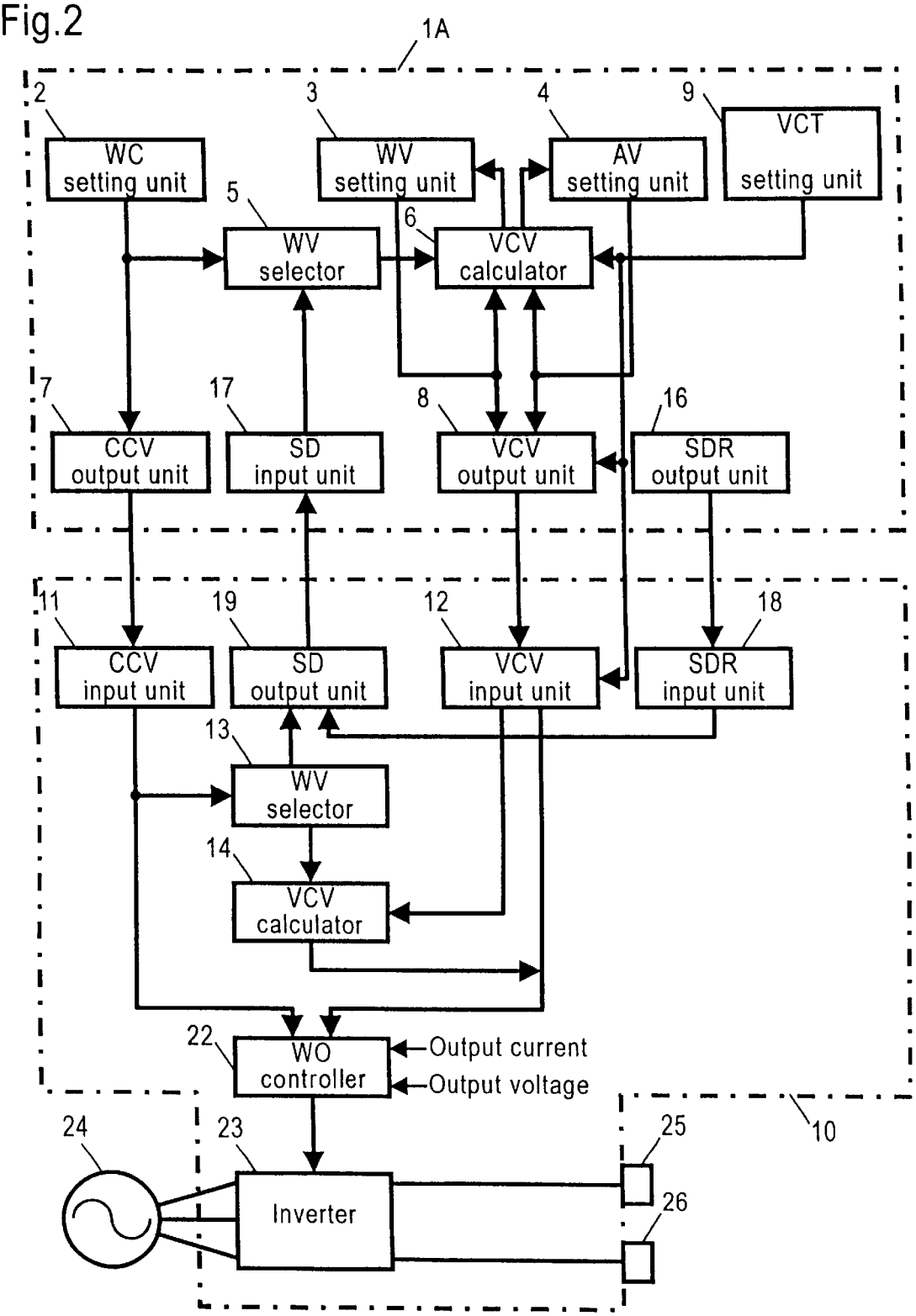
FIG. 2 is a block diagram showing the constitution of embodiment 1 of arc welding apparatus of the invention.
Figure 4:
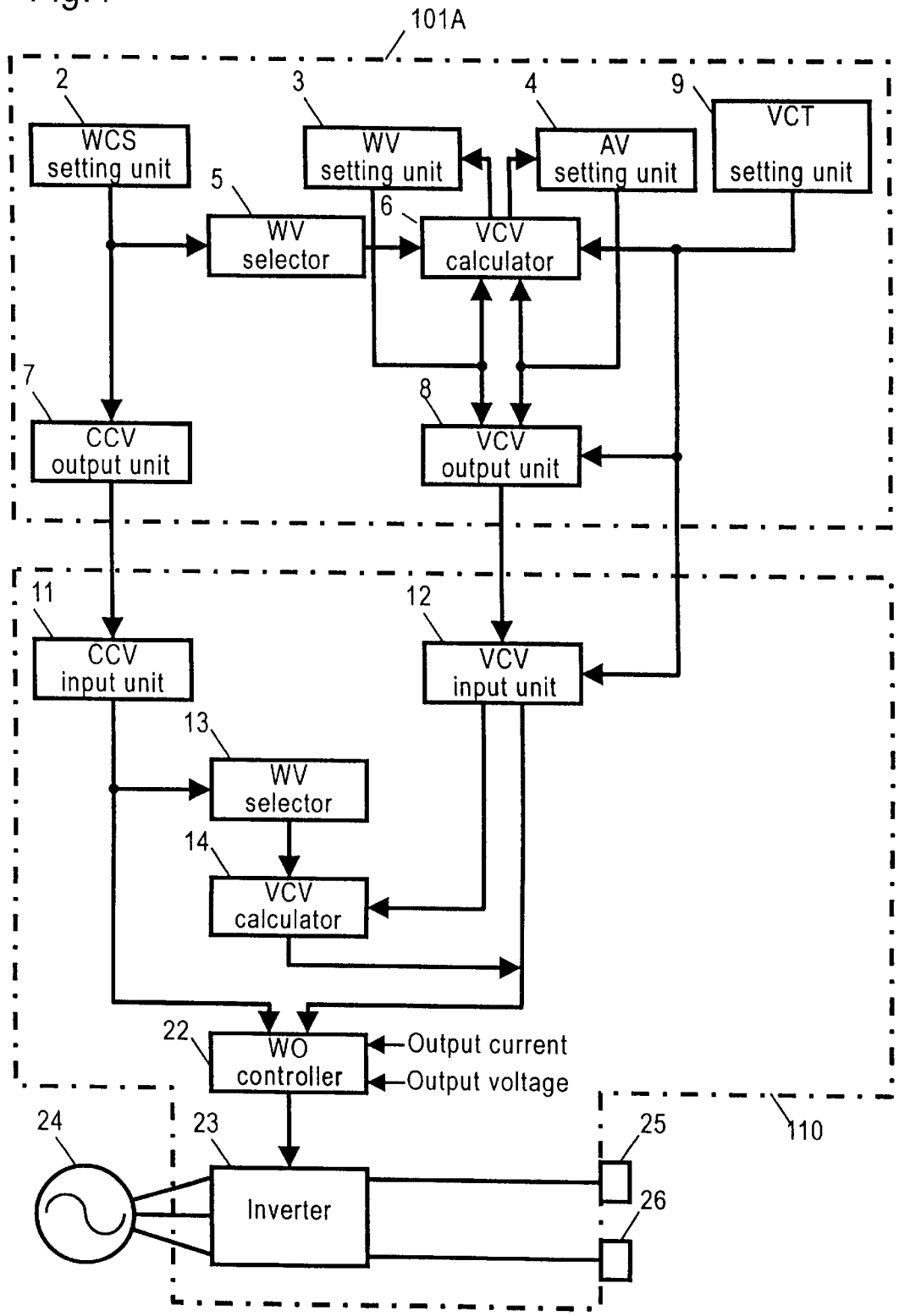
FIG. 4 is a structural diagram of a conventional arc welding apparatus.

As shown in FIG. 1, the arc welding apparatus of the invention comprises an arc welding robot 1, and an AWPS 10. The arc welding robot 1 is composed of an AWRC 1A and a manipulator 1B for moving a welding torch to a specified position. The operation of the manipulator 1B is controlled by the AWRC 1A. FIG. 2 is a block diagram of the arc welding robot 1 and AWPS 10. In the explanation of the embodiment, the parts having the same functions as in FIG. 4 are identified with same reference numerals, duplicate description is omitted.

The AWRC 1A comprises:
a) a WC setting unit 2 for welding,
b) a WV setting unit 3 for welding,
c) an AV setting unit 4 for welding,
d) a VCS setting unit 9 for changing over and setting the welding voltage command type or adjusting voltage command type,
e) a WV selector 5 for selecting and issuing an appropriate welding voltage depending on the current set in the WC setting unit 2,
f) a VCV calculator 6 for calculating the adjusting voltage from the selected voltage issued from the WV selector 5 and the welding voltage set in the WV setting unit 3, or calculating the welding voltage from the elected voltage issued from the WV selector 5 and the adjusting voltage set in the AV setting unit 4,
g) a CCV output unit 7 for receiving an output signal from the WC setting unit 2, and issuing a signal depending on the set current command value,
h) a VCV output unit 8 for issuing a signal depending on the voltage command value set in the WV setting unit 3, or the adjusting voltage set in the AV setting unit 4,
i) a stored data request output unit (hereinafter referred to simply as "SDR output unit") 16 for requesting stored data stored in the AWPS 10, and
j) a stored data input unit (hereinafter referred to simply as "SD input unit") 17 for accepting the stored data issued from the AWPS 10.

The AWPS 10 comprises:

a) a CCV input unit 11 for accepting the signal issued from the CCV output unit 7 of the AWRC 1A, b) a VCV input unit 12 for accepting the signal issued from the VCV output unit 8 of the AWRC 1A, c) a WV selector 13 for storing the data about welding of the AWPS 10, and selecting and issuing an appropriate welding voltage from the stored data depending on the current set in the CCV input unit 11, d) a VCV calculator 14 for calculating the voltage set value by adding the selected voltage entered from the WV selector 13 and the voltage entered from the VCV input unit 12, e) a stored data request input unit (hereinafter referred to simply as "SDR input unit") 18 for accepting the request from the SDR output unit 16 of the AWRC 1A, and f) a stored data output unit (hereinafter referred to simply as "SD output unit") 19 for acquiring and issuing the stored data from the WV selector 13.

The AWPS 10 further includes:

g) a WO controller 22, h) an inverter 23, and i) output terminals 25, 26.

The WV selector 13 is composed of a memory (not shown) and a selection output unit (not shown).

The memory stores a data table of each current determined individually for the welding method, electrode diameter, and welding material (hereinafter the data table stored in the memory is called the stored data).

The selection output unit selects and outputs an appropriate welding voltage from the stored data table depending on the set value of current.

Meanwhile, the WV selector 5 is composed of a memory (not shown) and a selection output unit (not shown).

This memory is a programmable memory for storing the data transmitted from the AWPS, and, stores the stored data obtained from the welding power supply 10. The stored data is a data table of each current determined individually for the welding method, electrode diameter, and welding material. The WV selector 5 selects and outputs an appropriate welding voltage from the stored data table in the memory depending on the set value of current.

What this embodiment 1 differs from the prior art in FIG. 4 lies in the following points.

That is, the AWRC 1A comprises:

the SDR output unit 16, and the SD input unit 17 for issuing the stored data to the WV selector 5.

Moreover, the AWPS 10 comprises:

the SDR input unit 18, and the SD output unit 19 for acquiring and issuing the stored data from the WV selector 13.

In this constitution, when a stored data request signal is issued from the AWRC 1A to the AWPS 10, the AWPS 10 sends the stored data to the AWRC 1A. When receiving the stored data, the AWRC 1A updates its already stored data in the AWRC 1A to the newly entered stored data.

In this constitution, the operation is described below.

First, until welding is started after the power is turned on, the SDR output unit 16 of the AWRC 1A issues a stored data request signal to the SDR input unit 18 of the AWPS 10. When the stored data request signal is entered in the SDR input unit 18, the SD output unit 19 of the AWPS 10 acquires the stored data from the WV selector 13 of the AWPS 10 and issues to the SD input unit 17 of the AWRC 1A. Further, the SD input unit 17 of the AWRC 1A stores the entered stored data in the memory (not shown) of the WV selector 5.

In the AWRC 1A, when the VCT setting unit 9 is set in the welding voltage command type, the WC setting unit 2 issues the set specified welding current, and the WV setting unit 3 issues the set specified welding voltage.

At this time, the WV selector 5 selects and issues an appropriate welding voltage corresponding to the current command value set in the WC setting unit 2. The VCV calculator 6 subtracts the selected voltage issued from the WV selector 5 and the welding voltage set in the WV setting unit 3, and calculates the adjusting voltage. The VCV calculator 6 issues the adjusting voltage obtained by this calculation to the AV setting unit 4. Further, the AV setting unit 4 stores the entered adjusting voltage in the memory (not shown).

When the VCT setting unit 9 is changed to the adjusting voltage command type, the AV setting unit 4 issues the adjusting voltage stored in the memory.

In the AWRC 1A, when the VCT setting unit 9 is set in the adjusting voltage command type, the WC setting unit 2 issues the set specified welding current. The AV setting unit 4 issues the set specified adjusting voltage.

At this time, the WV selector 5 selects and issues an appropriate welding voltage corresponding to the current command value set in the WC setting unit 2. The VCV calculator 6 adds the selected voltage issued from the WV selector 5 and the adjusting voltage set in the AV setting unit 4, and calculates the welding voltage. The VCV calculator 6 issues the welding voltage to the WV setting unit 3. Further, the WV setting unit 3 stores the entered welding voltage in the memory (not shown).

When the VCT setting unit 9 is changed to the welding voltage command type, the WV setting unit 3 issues the welding voltage stored in the memory.

In this manner, after setting the welding current, welding voltage, and adjusting voltage, the CCV output unit 7 receives an output signal from the WC setting unit 2, and issues a signal corresponding to the set current command value. The VCV output unit 8, when the VCT setting unit 9 is set in the welding voltage command type, issues a signal corresponding to the voltage command value set in the WV setting unit 3. When set in the adjusting voltage command type, the voltage command value output unit 7 issues a signal corresponding to the adjusting voltage set in the AV setting unit 4.

On the other hand, in the AWPS 10, when the VCT setting unit 9 is set in the welding voltage command type, the CCV input unit 11 receives an output signal from the CCV output unit 7, and issues a current set value. The VCV input unit 12 receives an output signal from the VCV output unit 8, and issues a voltage set value.

Also in the AWPS 10, when the VCT setting unit 9 is set in the adjusting voltage command type, the CCV input unit 11 receives an output signal from the CCV output unit 7, and issues a current set value. The VCV input unit 12 receives an output signal from the VCV output unit 8, and issues an adjusting voltage.

The WV selector 13 selects and issues an appropriate welding voltage depending on the current command value entered in the CCV input unit 11. The VCV calculator 14 adds the selected voltage issued from the WV selector 13 and the adjusting voltage issued from the VCV input unit 12, and calculates the voltage set value. The VCV calculator 14 issues the voltage set value.

The WO controller 22 receives the current set value issued from the CCV input unit 11, and the voltage set value issued from the VCV input unit 12 or the voltage set value issued from the VCV calculator 14. The WO controller 22 controls the inverter so that the current set value and output current, or the voltage set value and output voltage may coincide with each other, and applies an output for welding to output terminals 25, 26.

In the conventional arc welding apparatus, a large capacity was required in the memory of the welding voltage selector of the AWRC in order to be applicable to various types of AWPS.

According to the embodiment, however, the stored data in the welding voltage selector of the AWRC can be updated to the stored data of the AWPS being connected. Therefore, the memory capacity of the welding voltage selector of the AWRC may be a minimum required limit. For various types of AWPS, the voltage command type can be easily changed over to the welding voltage command type or adjusting voltage command type.

In FIG. 2, the output of the VCT setting unit 9, the output of the CCV output unit 7, the output of the VCV output unit 8, the output of the SDR output unit 16, and the output of the SD output unit 19 are individually described. However, by connecting the AWRC and AWPS by serial communication or other communication means, these outputs may be transmitted and received by time sharing, so that the same effects as in the embodiment are obtained.

In FIG. 1 and FIG. 2, the AWRC is explained, but the same effects are obtained by using sequencer or other peripheral device for arc welding for controlling the welding start and end sequence, or changeover of welding condition (welding current, welding voltage).

(Embodiment 2)

Embodiment 2 of AWPS of the invention is described below while referring to the accompanying drawing.

Figure 3:
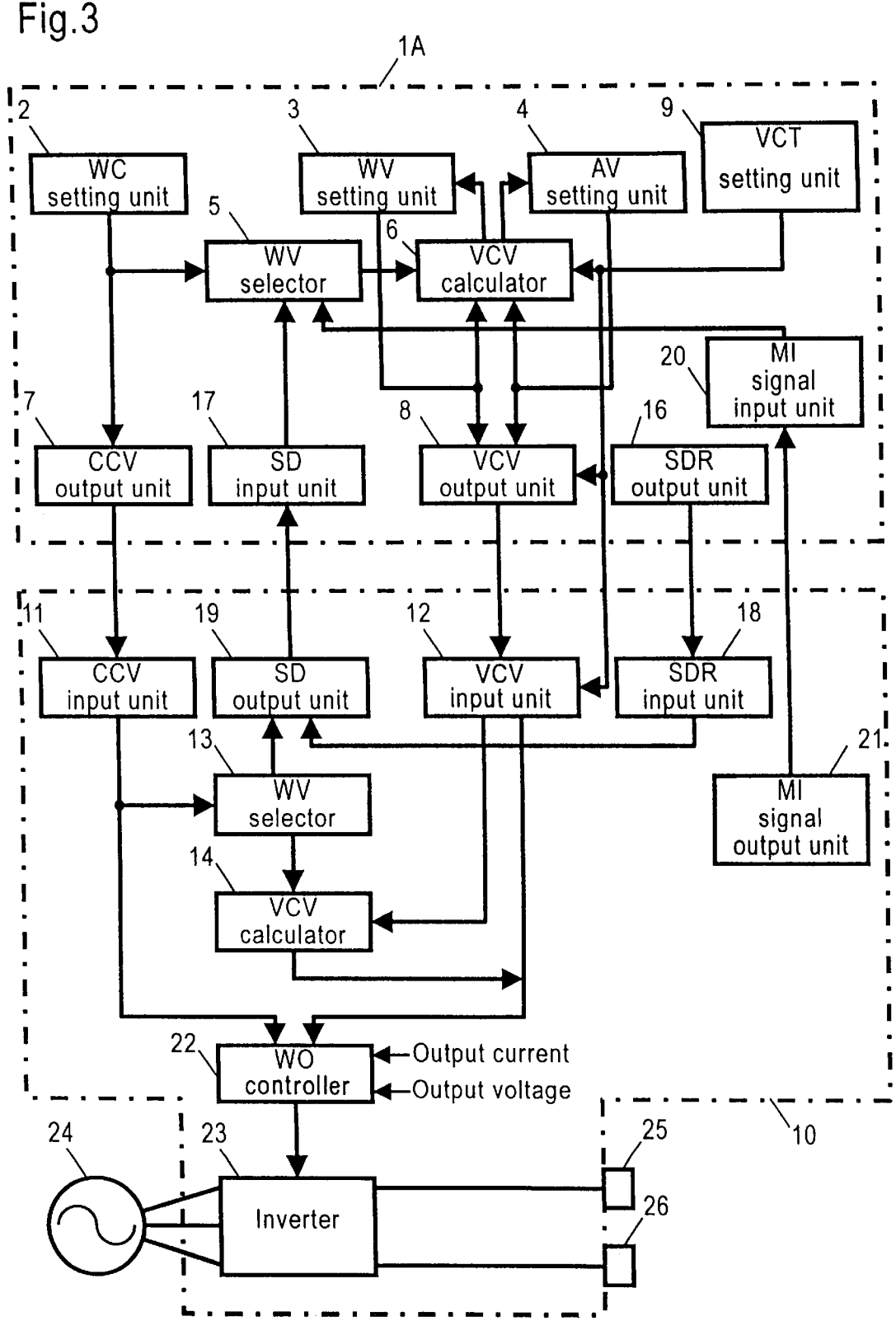
FIG. 3 is a block diagram showing a constitution of embodiment 2 of arc welding apparatus of the invention.

FIG. 3 is a block diagram of this embodiment. The parts having the same functions as embodiment 1 in FIG. 2 are identified with same reference numerals, duplicate description is omitted.

What this embodiment differs from embodiment 1 lies in the following points:

A model identification signal input unit (hereinafter referred to simply as "MI signal input unit") 20 is added in the AWRC 1A; and A model identification signal output unit (hereinafter referred to simply as "MI signal output unit") 21 is added in the AWPS 10.

A model identification signal is issued from the AWPS 10 to the AWRC 1A. The AWRC 1A prohibits setting of welding method, electrode diameter, and welding material not applicable in the AWPS 10. When a stored data request signal is issued from the AWRC to AWPS, the AWPS sends stored data to the AWRC. Receiving the stored data, the AWRC updates the already stored data to the newly entered stored data.

In this constitution, the operation is described below.

First, until welding is started after the power is turned on, the MI signal output unit 21 of the AWPS 10 issues a preset model identification signal specified for each model to the MI signal input unit 20 of the AWRC 1A. Depending on the entered model identification signal, the AWRC 1A prohibits selection of welding method, electrode diameter and welding material not applicable to the AWPS 10. The SDR output unit 16 of the AWRC 1A issues a stored data request signal to the SDR input unit 18 of the AWPS 10. The SD output unit 19 of the AWPS 10, when the stored data request signal is entered in the SDR input unit 18, acquires the stored data from the WV selector 13 of the AWPS 10 and issues to the SD input unit 17 of the AWRC 1A. Further, the SD input unit 17 of the AWRC 1A stores the entered stored data in the memory (not shown) of the WV selector 5.

In the AWRC 1A, when the VCT setting unit 9 is set in the welding voltage command type, the WC setting unit 2 issues the set specified welding current, and the WV setting unit 3 issues the set specified welding voltage.

At this time, the WV selector 5 selects and issues an appropriate welding voltage corresponding to the current command value set in the WC setting unit 2. The VCV calculator 6 subtracts the selected voltage issued from the WV selector 5 and the welding voltage set in the WV setting unit 3, and calculates the adjusting voltage. The VCV calculator 6 issues the adjusting voltage to the AV setting unit 4. Further, the AV setting unit 4 stores the entered adjusting voltage in the memory (not shown).

When the VCT setting unit 9 is changed to the adjusting voltage command type, the AV setting unit 4 issues the adjusting voltage stored in the memory.

In the AWRC 1A, when the VCT setting unit 9 is set in the adjusting voltage command type, the WC setting unit 2 issues the set specified welding current. The AV setting unit 4 issues the set specified adjusting voltage.

At this time, the WV selector 5 selects and issues an appropriate welding voltage corresponding to the current command value set in the WC setting unit 2. The VCV calculator 6 adds the selected voltage issued from the WV selector 5 and the adjusting voltage set in the AV setting unit 4, and calculates the welding voltage. The VCV calculator 6 issues the welding voltage to the WV setting unit 3. Further, the WV setting unit 3 stores the entered welding voltage in the memory (not shown).

When the VCT setting unit 9 is changed to the welding voltage command type, the WV setting unit 3 issues the welding voltage stored in the memory.

In this manner, after setting the welding current, welding voltage, and adjusting voltage, the CCV output unit 7 receives an output signal from the WC setting unit 2, and issues a signal corresponding to the set current command value. The VCV output unit 8, when the VCT setting unit 9 is set in the welding voltage command type, issues a signal corresponding to the voltage command value set in the WV setting unit 3. When set in the adjusting voltage command type, the VCV output unit 8 issues a signal corresponding to the adjusting voltage set in the AV setting unit 4.

On the other hand, in the AWPS 10, when the VCT setting unit 9 is set in the welding voltage command type, the CCV input unit 11 receives in output signal from the CCV output unit 7, and issues a current set value. The VCV input unit 12 receives an output signal from the VCV output unit 8, and issues a voltage set value.

Also in the AWPS 10, when the VCT setting unit 9 is set in the adjusting voltage command type, the CCV input unit 11 receives an output signal from the CCV output unit 7, and issues a current set value. The VCV input unit 12 receives an output signal from the VCV output unit 8, and issues an adjusting voltage.

The WV selector 13 selects and issues an appropriate welding voltage depending on the current command value entered in the CCV input unit 11. The VCV calculator 14 adds the selected voltage issued from the WV selector 13 and the adjusting voltage issued from the VCV input unit 12, and issues the calculated voltage set value.

The WO controller 22 receives the current set value issued from the CCV input unit 11, and the voltage set value issued from the VCV input unit 12 or the voltage set value issued from the VCV calculator 14. The WO controller 22 controls the inverter so that the current set value and output current, or the voltage set value and output voltage may coincide with each other, and applies an output for welding to the output terminals 25, 26.

Thus, according to the embodiment, depending on the type of the AWPS, the stored data in the memory of the welding voltage selector of the AWRC can be updated to the stored data of the AWPS being connected. Therefore, the memory capacity of the welding voltage selector of the AWRC may be a minimum required limit. For various types of AWPS, the voltage command type can be easily changed over to the welding voltage command type or adjusting voltage command type.

In FIG. 3, the output of the MI signal output unit 21, the output of the VCT setting unit 9, the output of the CCV output unit 7, the output of the VCV output unit 8, the output of the SDR output unit 16, and the output of the SD output unit 19 are individually described, but by connecting the AWRC and AWPS by serial communication or other communication means, these outputs may be transmitted and received by time sharing, so that the same effects as in the embodiment are obtained.

In FIG. 3, the AWRC is explained, but the same effects are obtained by using sequencer or other peripheral device for arc welding for controlling the welding start and end sequence, or changeover of welding condition (welding current, welding voltage).

As clear from the description herein, in the AWPS, peripheral device for arc welding, and arc welding apparatus of the invention, the memory capacity for stored data in the peripheral device for arc welding may be kept to a minimum required limit.

Also in the AWPS, peripheral device for arc welding, and arc welding apparatus of the invention, setting of the welding method, electrode diameter, and welding material of the individual AWPS can be distinguished by the peripheral device for arc welding, and hence the memory capacity for stored data in the peripheral device for arc welding may be kept to a minimum required limit.

What is claimed is:

1. An arc welding power supply for outputting a welding output to a peripheral device for arc welding, said arc welding power supply comprising:
    a welding output controller operable to control an output current and an output voltage as said welding output;
    output means for outputting said welding output to said peripheral device according to an instruction from said welding output controller;
    a memory for storing a data table including a welding current and an appropriate welding voltage corresponding to a welding current; and
    a stored data output unit for issuing said data table to said peripheral device.

2. The arc welding power supply of claim 1, further comprising a stored data request input unit for accepting an output request signal of the data table from said peripheral device, said stored data request input unit being operable to make said stored data output unit issue said data table after accepting said output request signal.

3. The arc welding power supply of claim 1, further comprising a model identification signal output unit for issuing a model identification signal preset according to a type of said arc welding power supply.

4. A peripheral device for arc welding to which an arc welding power supply issues a data table including a welding current and an appropriate welding voltage corresponding to a said welding current, said peripheral device comprising:
    a stored data input unit for acquiring said data table from said arc welding power supply, and
    a welding voltage selector for storing said acquired data table.

5. The peripheral device of claim 4, further comprising a stored data request output unit for outputting an output request signal to said arc welding power supply for requesting said arc welding power supply to issue said data table, wherein said arc welding power supply issues said data table to said stored data input unit after receiving said output request signal.

6. The peripheral device of claim 4, further comprising a model identification signal input unit for receiving a model identification signal for distinguishing a type of said arc welding power supply.

7. An arc welding apparatus comprising a peripheral device for arc welding and an arc welding power supply, wherein said peripheral device for arc welding comprises:
    a) a welding current setting unit for welding,
    b) a welding voltage setting unit for welding,
    c) an adjusting voltage setting unit for welding,
    d) a voltage command type setting unit for changing over and setting the welding voltage command type or adjusting voltage command type,
    e) a welding voltage selector for selecting and issuing an appropriate welding voltage depending on the current set in the welding current setting unit,
    f) a voltage command value calculator for calculating the adjusting voltage from the selected voltage issued from the welding voltage selector and the welding voltage set in the welding voltage setting unit, or calculating the welding voltage from the selected voltage issued from the welding voltage selector and the adjusting voltage set in the adjusting voltage setting unit,
    g) a current command value output unit for receiving an output signal from the welding current setting unit, and issuing a signal depending on the set current command value,
    h) a voltage command value output unit for issuing a signal depending on the voltage command value set in the welding voltage setting unit, or the adjusting voltage set in the adjusting voltage setting unit,
    i) a stored data request output unit for requesting stored data stored in the welding power supply, and
    j) a stored data input unit for accepting the stored data issued from the welding power supply.

8. The arc welding apparatus of claim 7, wherein the welding voltage selector of said peripheral device for arc welding comprises a memory and a selector, and said memory is an electrically erasable and programmable memory.

9. The arc welding apparatus of claim 7, wherein said arc welding power supply comprises:
    a) a current command value input unit for accepting the signal issued from the current command value output unit of said peripheral device for arc welding,
    b) a voltage command value input unit for accepting the signal issued from the voltage command value output unit of said peripheral device for arc welding,
    c) a welding voltage selector for storing the data about welding of said welding power supply, and selecting and issuing an appropriate welding voltage from the stored data depending on the current set in the current command value input unit, d) a voltage command value calculator for calculating the voltage set value by adding the selected voltage entered from the welding voltage selector and the adjusting voltage entered from the voltage command value input unit, e) a stored data request input unit for accepting the request from the stored data request output unit of the peripheral device for arc welding, and f) a stored data output unit for acquiring and issuing the stored data from the welding voltage selector.

10. The arc welding apparatus of claim 7, further comprising a model identification signal output unit for issuing a model identification signal preset depending on the type of the arc welding power supply.

11. The arc welding apparatus of claim 7, further comprising a model identification signal input unit for receiving a model identification signal for distinguishing the type of the arc welding power supply.

* * * * *